(12) United States Patent
De Wergifosse

(10) Patent No.: US 8,487,560 B2
(45) Date of Patent: Jul. 16, 2013

(54) ELECTRIC BRAKE SYSTEM WITH MAGNETIC LOSS

(75) Inventor: Eric De Wergifosse, Saint Augustin (FR)

(73) Assignee: Hispano Suiza, Colombes (FR)

( * ) Notice: Subject to any disclaimer, the term of this patent is extended or adjusted under 35 U.S.C. 154(b) by 96 days.

(21) Appl. No.: 13/129,200

(22) PCT Filed: Nov. 12, 2009

(86) PCT No.: PCT/EP2009/065014
§ 371 (c)(1),
(2), (4) Date: Jul. 7, 2011

(87) PCT Pub. No.: WO2010/055074
PCT Pub. Date: May 20, 2010

(65) Prior Publication Data
US 2011/0254475 A1    Oct. 20, 2011

(30) Foreign Application Priority Data
Nov. 14, 2008    (FR) ...................... 08 57726

(51) Int. Cl.
*H02P 3/12*    (2006.01)
*H02P 3/00*    (2006.01)

(52) U.S. Cl.
USPC ............ 318/380; 318/372; 318/375; 318/379

(58) Field of Classification Search
USPC .................................. 318/372, 375, 379, 380
See application file for complete search history.

(56) References Cited

U.S. PATENT DOCUMENTS

| | | | |
|---|---|---|---|
| 6,072,291 A | 6/2000 | Pedersen | |
| 6,075,332 A * | 6/2000 | McCann | 318/432 |
| 6,456,032 B2 * | 9/2002 | Itoh et al. | 318/727 |
| 6,657,833 B2 * | 12/2003 | Matsuki et al. | 361/23 |
| 6,752,614 B2 * | 6/2004 | Mizuno | 425/145 |
| 2005/0013145 A1 | 1/2005 | Huber | |
| 2008/0074074 A1 | 3/2008 | Skibinski et al. | |
| 2009/0056856 A1 * | 3/2009 | Taylor et al. | 156/64 |
| 2009/0057300 A1 * | 3/2009 | Taylor et al. | 219/635 |

OTHER PUBLICATIONS

French Preliminary Search Report issued Jul. 23, 2009, in Patent Application No. FR 0857726.
David Ki-Wai Cheng, et al., "Design, Modeling, and Analysis of Integrated Magnetics for Power Converters", Power Electronics Specialists Conference, vol. 1, XP 10517257, Jun. 18, 2000, pp. 320-325.

* cited by examiner

*Primary Examiner* — Eduardo Colon Santana
*Assistant Examiner* — Gabriel Agared
(74) *Attorney, Agent, or Firm* — Oblon, Spivak, McClelland, Maier & Neustadt, L.L.P.

(57) ABSTRACT

An electric brake system for an electromechanical machine connected to output terminals of an inverter, input terminals of which are supplied by a DC voltage source. The system includes an electrical circuit connected between the input terminals of the inverter and including, connected in series: a mechanism dissipating electrical energy returned by the electromechanical machine to the input terminals of the inverter during a braking phase of the electromechanical machine, including an inductor wound around a magnetic circuit; and a switching mechanism to close the electrical circuit during a braking phase of the electromechanical machine and to open the electrical circuit in absence of a braking phase of the electromechanical machine.

8 Claims, 4 Drawing Sheets

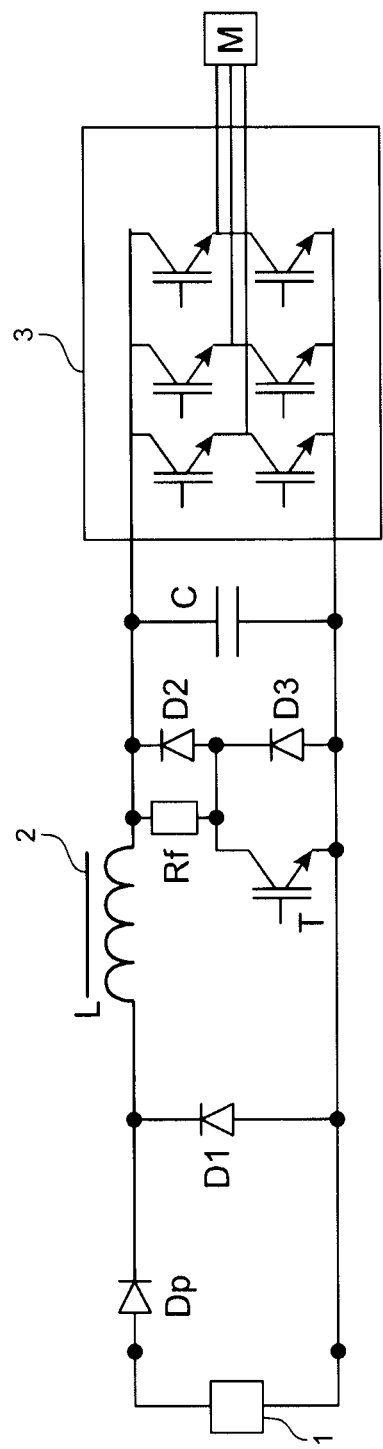
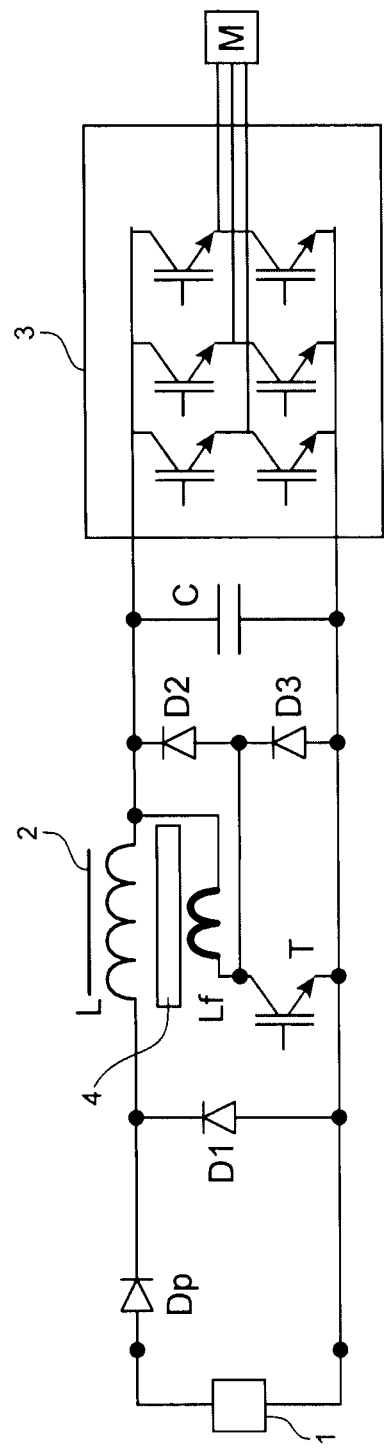
FIG.1
FIG.2

ELECTRIC BRAKE SYSTEM WITH MAGNETIC LOSS

TECHNICAL FIELD

The invention relates to an electric brake system with magnetic loss intended to dissipate the energy produced by an electromechanical machine during the braking phase, when the power supply network or its interface is not bidirectional.

BACKGROUND OF THE INVENTION

Both in the event the electromechanical machine is powered directly by direct current (e.g. brush motor) and in the event it is powered by alternating current via an inverter, the energy generated during braking phases of the machine is generally dissipated by a system connected to the DC bus. In most cases, this dissipation is done by resistors. When these resistors must store significant amounts of energy and/or when they must withstand a large number of operating cycles, they become heavy, bulky and expensive. Furthermore, the dissipation flow towards the wall of the housing in which they are fastened is, in these cases, difficult to control. This makes heat management of the application difficult.

FIG. 1 is an electrical diagram showing a traditional electric braking system with dissipation of the energy returned by the braking in a resistor. This electric brake system is arranged in the supply circuit of an electromechanical machine M. The supply circuit comprises a DC voltage source 1 supplying, via a protection diode Dp, an inverter 3 at the terminals of which the electromechanical machine M is connected. Between the cathode of the protection diode Dp and the −terminal the DC voltage source 1 is connected, inversely, a freewheeling diode Dl and a differential mode filter. The differential mode filter comprises an inductor L, wound around a magnetic circuit 2, and a capacitor C. The inverter 3 is connected to the terminals of the capacitor C. The electric brake system comprises a first branch comprising two diodes D2 and D3 connected in series and inversely to the terminals of the capacitor C. A second branch comprising a brake resistor Rf in series with a transistor (IGBT or other) referenced T is connected to the terminals of the capacitor C. The middle point between the brake resistor Rf and the transistor T is connected to the middle point located between the diodes D2 and D3. During braking of the electromechanical machine M, the braking energy is dissipated in the resistor Rf.

The operation of the circuit of FIG. 1 is as follows. When the electromechanical machine M supplies mechanical energy, the transistor T is controlled to be in the locked mode and no current flows in the resistor Rf. The diodes D2 and D3 are not operative in this phase. When the electromechanical machine receives mechanical energy, the inverter 3 returns electrical energy to the capacitor C. By making the transistor T conductive, usually via a PWM (Pulse Width Modulation), one then causes an electric current to pass in the resistor Rf and the dissipation in thermal form of the electrical energy returned by the electromechanical machine to the input of the inverter. The diodes D2 and D3 serve as freewheeling diodes for all of the parasitic inductors of the branch made up of the resistor Rf and the transistor T.

Document U.S. Pat. No. 6,072,291 discloses an electric brake system for an electromechanical machine connected to the output terminals of an inverter whereof the input terminals are supplied by a DC voltage source. The system comprises an electrical circuit connected between the input terminals of the inverter and comprising, connected in series:

a means for dissipating electrical energy returned by the electromechanical machine to the input terminals of the inverter during a braking phase of the electromechanical machine, a switching means intended to close said electrical circuit during a braking phase of the electromechanical machine and to open said electrical circuit in the absence of a braking phase of the electromechanical machine.

According to patent U.S. Pat. No. 6,072,291, the electrical energy, which is returned to the input terminals of the inverter during a braking phase, is primarily dissipated in a brake resistor.

BRIEF DESCRIPTION OF THE INVENTION

The invention proposes a solution other than the dissipation in an electrical resistor, for the electric braking of an electromechanical machine. The proposed solution is to dissipate, in the core of an inductor, the energy produced by an electromechanical machine during a braking phase, this inductor for example sharing the same magnetic core as the filtering inductor for the DC voltage supply.

The magnetic losses in the core depend on the frequency and amplitude of the induction variation. The amount of energy dissipated in the core can therefore be assayed at any time by a fixed or variable frequency PWM applied to the transistor T.

The invention therefore relates to an electric brake system for an electromechanical machine connected to the output terminals of an inverter whereof the input terminals are supplied by a DC voltage source, the system comprising an electrical circuit connected between the input terminals of the inverter and comprising, connected in series:

a means for dissipating the electrical energy returned by the electromechanical machine to the input terminals of the inverter during a braking phase of the electromechanical machine, a switching means intended to close said electrical circuit during a braking phase of the electromechanical machine and to open said electrical circuit in the absence of a braking phase of the electromechanical machine, characterized in that the means for dissipating the electrical energy comprises an inductor wound around a magnetic circuit, the energy recovered by the inductor during a braking phase being dissipated by loss of hysteresis and eddy currents in the magnetic circuit.

A differential mode filter can be used. This filter can comprise a filtering inductor, wound around a magnetic circuit and placed in series between the DC voltage source and the inverter, and a filtering capacitor placed between the input terminals of the inverter. The filtering inductor and the dissipation inductor may or may not have a shared magnetic circuit depending on the embodiment.

According to one embodiment, the filtering inductor and the dissipation inductor use the same magnetic circuit, but are not magnetically coupled to each other. In that case, the magnetic circuit can be an EI or EE circuit, the filtering inductor comprising two identical coils connected in series, each coil being wound on an outer leg of the E, the dissipation inductor being wound on the central leg of the E. The opposite arrangement is also possible, the dissipation inductor comprising two identical coils connected in series, each coil being wound on an outer leg of the E, the filtering inductor being wound on the central leg of the E.

According to another embodiment, the filtering inductor and the dissipation inductor are coupled together. In that case, the magnetic circuit can be an O-shaped circuit having two opposite winding branches, the filtering inductor being made up of two coils connected in series, each being wound around a branch, the dissipation inductor being made up of two coils connected in series, each also being wound around a branch.

The invention is applicable to all reversible electromechanical machines connected to a DC bus, directly or via a converter. In most applications, this will involve a three-phase synchronous or asynchronous machine connected to the DC bus via a three-phase inverter. To simplify the explanation, only this case will be presented, but this in no way excludes other cases of machines/converters.

BRIEF DESCRIPTION OF THE DRAWING

The invention will be better understood and other advantages and features thereof will appear upon reading the following description, provided as a non-limiting example, accompanied by the appended drawings, in which:

FIG. 1, already described, is an electrical diagram showing an electric brake system, arranged in the electrical power supply circuit of an electromechanical machine, with dissipation of the energy recovered by the braking in a resistor, according to the prior art, FIG. 2 is an electrical diagram showing a first electric brake system, arranged in the electrical power supply circuit of an electromechanical machine, with dissipation of the energy returned by the braking in an inductor wound around a different magnetic circuit from that of the filtering inductor, according to the invention;

DETAILED DESCRIPTION OF THE INVENTION

In the following part of the description, the elements of the electrical diagrams that are identical to the elements shown in the electrical diagram of FIG. 1 will be referenced identically.

FIG. 2 is an electrical diagram showing a first electric brake system, arranged in the electrical supply circuit of an electromechanical machine (a three-phase motor, for example), with dissipation of the energy returned by the braking in an inductor wound around a magnetic circuit.

The diagram of FIG. 2 differs from that of FIG. 1 in that the dissipation resistor Rf for the braking energy is replaced by an inductor Lf wound around a magnetic circuit 4. In this diagram, there is no coupling and no shared element between the inductors L and Lf. During a braking phase, the energy recovered by the inductor Lf is dissipated by losses of hysteresis and eddy currents in the magnetic circuit 4.

Figure 3:
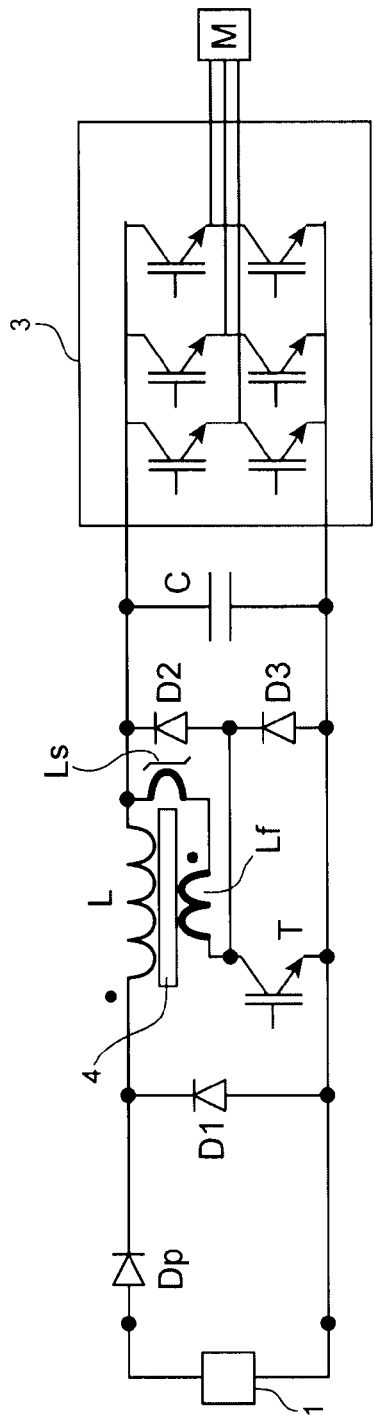
FIG. 3 is an electrical diagram showing a second electric braking system, arranged in the electrical power supply circuit of an electromechanical machine, with dissipation of the energy recovered by the braking in an inductor wound around a magnetic circuit shared with that of the filtering inductor, according to the invention.

FIG. 3 is an electrical diagram showing a second electric braking system according to the invention. In this embodiment, the magnetic circuit 4 is shared by the inductor L of the differential mode filter and the dissipation inductor Lf of the braking energy. In this case, the coils of the inductors L and Lf are coupled. Reference Ls designates a saturable inductor, arranged in series with the inductor Lf, and intended to maintain the filtering quality.

Figure 4:
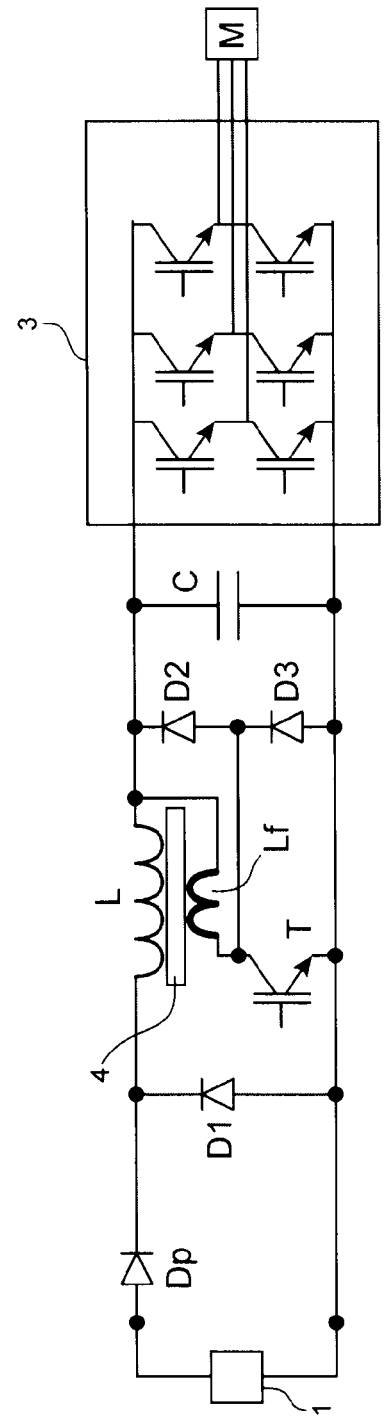
FIG. 4 is an electrical diagram showing a third electric brake system, arranged in the electrical power supply circuit of an electromechanical machine, with dissipation of the energy returned by the braking in an inductor wound around a magnetic circuit shared with that of the filtering inductor but without magnetic coupling, according to the invention.
Figure 5:
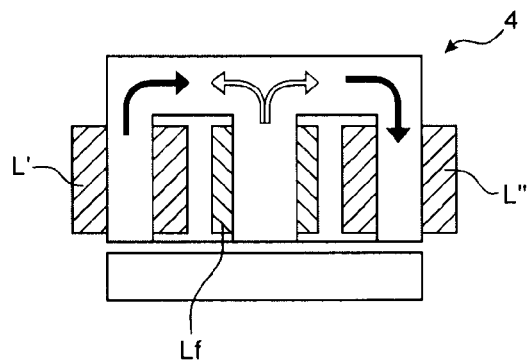
FIG. 5 shows a magnetic circuit equipped with inductors, usable in the electric braking system, described in FIG. 4, according to the invention.

FIG. 4 is an electrical diagram showing a third electric brake system according to the invention. In this embodiment, the magnetic circuit 4 is shared with the inductor L of the differential mode filter and the dissipation inductor Lf of the braking energy. Unlike the electric brake system shown in the diagram of FIG. 3, there is no magnetic coupling between the coils of the inductors L and Lf. To obtain this result, it is for example possible to use an EI-shaped magnetic circuit 4 as shown in FIG. 5. The inductor L of the differential mode filter is then made up of two identical coils L' and L" connected in series and each arranged on an outer leg of the E-shaped portion of the magnetic circuit. For operation in filtering mode, i.e. during a phase where the power supplied by the DC voltage source is oriented towards the motor, there is no magnetic flow in the central leg of the E (see dark arrows in FIG. 5). The inductor Lf dissipating the braking energy is wound on the central leg of the E-shaped portion of the magnetic circuit. During operation in braking mode, the magnetic flows circulating in the outer legs of the E-shaped magnetic circuit portion are in opposite directions (see light arrows in FIG. 5). There is therefore no electric voltage generated at the terminals of the differential mode filter inductor L.

Figure 6:
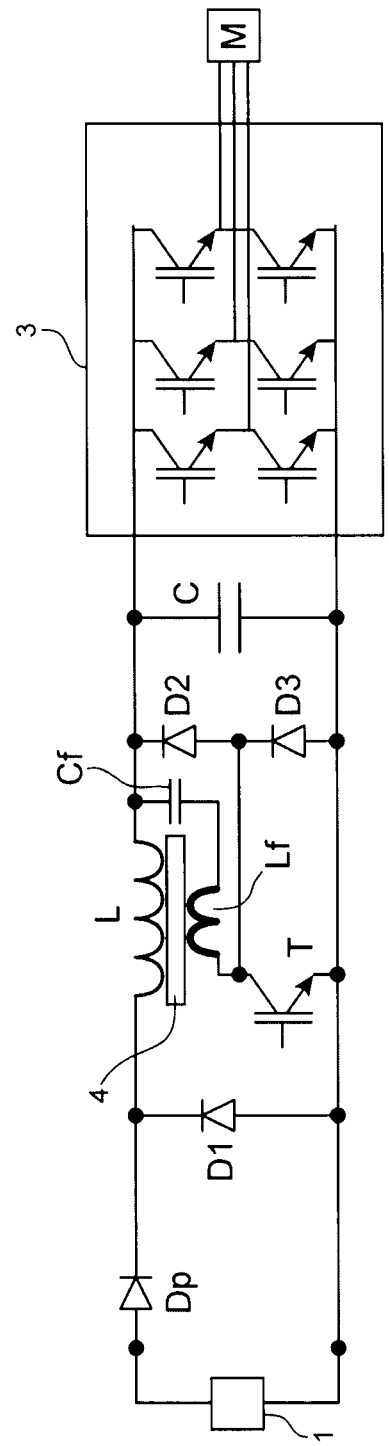
FIG. 6 is an electrical diagram showing a fourth electric brake system, arranged in the electrical power supply circuit of an electromechanical machine, with dissipation of the energy returned by the braking in an inductor wound around a magnetic circuit, according to the invention.

FIG. 6 is an electrical diagram showing a fourth electric brake system according to the invention. In this embodiment, the magnetic circuit 4 is shared by the inductor L of the differential mode filter and the inductor Lf dissipating the braking energy. A capacitor Cf is added in series with the inductor Lf. The value of the capacitor Cf is chosen to form a resonant circuit (for a frequency of about 20 kHz) with the inductor Lf. In the case of FIG. 6, this is therefore a serial resonant circuit, but it is possible to consider a parallel resonant circuit. The interest of this alternative lies in the decrease of the losses in the electronic switch of the brake and in the moderation of the electromagnetic interference (EMI) level.

Figure 7:
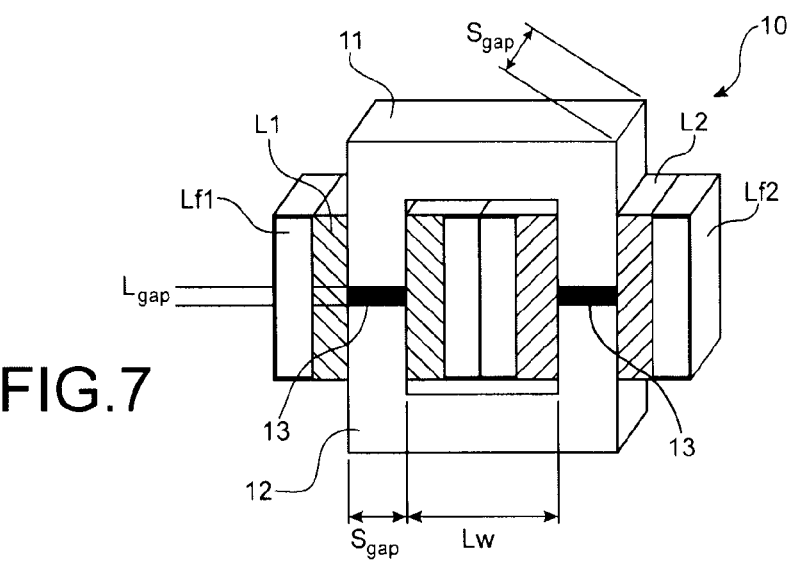
FIG. 7 is a perspective view of a magnetic circuit equipped with inductors, usable in the electric brake system, except for that described in FIG. 4, according to the invention.

FIG. 7 is a perspective view of a magnetic circuit equipped with inductors, which can be used in the electric brake system according to the invention. The magnetic circuit 10 comprises two C-shaped portions 11 and 12 whereof the respective ends are opposed. The material of the magnetic circuit is in this example of the FeSi type at a rate of 3% of Si by weight. An air gap made from a non-magnetic material 13 (e.g. air, an electrical insulator) is provided between the ends of the opposed portions 11 and 12 so as to prevent saturation. The filtering and energy dissipation inductors are each distributed in two coils as shown in FIG. 7. The filtering inductor is first wound. It comprises a first coil L1 and a second coil L2 connected in series. The dissipation inductor is then wound. It comprises a first wire coil Lf1 and a second coil Lf2 connected in series. As an example, the dimensions of the magnetic circuit can be as follows:

width of the air gap 13, Lgap=1.05 mm,
height of the coil window, Hw=14.7 mm
width of the coil window, Lw=11.5 mm
length of the sides of the magnetic circuit, Sgap=20.9 mm.

The characteristics of the inductor of the differential mode filter are for example: 240 µH, 50 A max, 10 A alternating, resistance 40 mΩ, 28 turns. The characteristics of the dissipation inductor are for example: 15 µH, 50 A average, 150 A peak, resistance 2.5 mΩ, 7 turns.

This magnetic circuit equipped with these inductors allows an application on a DC bus of 300 V, 15 kW, 10 kJ. This means that the brake power build-up time is 15 kW in 10 µs. With a peak induction of 0.75 T, it is possible to dissipate 15,800 W with a PWM (pulse width modulation) command 300 V at 23 kHz controlling 150 A peak for 50 A average.

If a specific heat of 400 J/° C.kg is considered for the FeSi 3% and assuming that a temperature increase of 50° C. is tolerable, the magnetic circuit is capable of absorbing 10 kJ in pulse mode.

If the heat capacity is not sufficient, adding phase change materials can be considered.

In the event of a high average dissipation, good thermal contact with the case is easy to achieve.

If no heat flow with the rest of the case is desired, the magnetic circuit can be equipped with its own cooling system.

Figure 8:
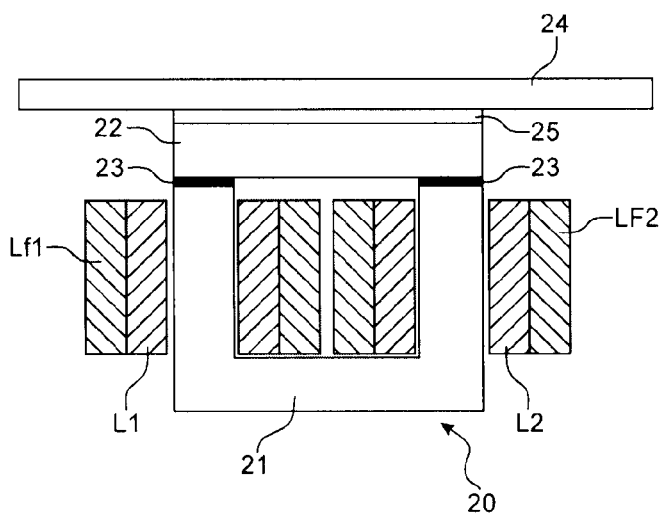
FIG. 8 illustrates how to arrange a magnetic circuit, usable in the electric brake system according to the invention, in a case housing the electric brake system.

FIG. 8 illustrates how to arrange a magnetic circuit usable in the electric brake system according to the invention, in a case housing the electric brake system. In this application, the aim is to be able to absorb a large amount of energy in a very short period of time and to then dissipate it, slowly towards the wall of the case. The magnetic circuit 20 comprises two portions: a C-shaped portion 21 and an I-shaped portion 22. The portions 21 and 22 are assembled to close the magnetic circuit with the insertion of an air gap 23 made from a non-magnetic and non-conducting material. As for the structure shown in FIG. 7, the filtering inductor has two coils L1 and L2 connected in series, the dissipation inductor having two coils LF1 and LF2 connected in series. The structure obtained is fastened to the wall 24 of the case via a means 25 having a suitable thermal resistance. This arrangement makes it possible, in the event of a strong braking energy pulse, to gradually dissipate the generated heat towards the wall of the case. The fastening can be done by gluing.

The invention procures substantial gains in mass and volume, in particular if sharing is possible with the differential mode filtering inductor. The use of a high temperature magnetic material would also make it possible to increase this gain.

The invention also procures substantial gains in reliability and lifetime owing to excellent resistance to thermal cycling.

The main interest of the solution lies in the flexibility of managing the dissipated energy owing to the innumerable possibilities for adapting the magnetic circuit relative to the electronic case. It is easier to optimize the thermal conditions of the assembly.

The higher the power and braking energy level, the more the proposed solution becomes interesting. The lower interest threshold should be around several tens of watts.

The minor loop for the braking power, which regulates the voltage of the DC bus, becomes higher performing in terms of stability margin and reaction time.

The invention claimed is:

1. An electric brake system for an electromechanical machine connected to output terminals of an inverter, wherein input terminals are supplied by a DC voltage source, the system comprising:
    an electrical circuit connected between the input terminals of the inverter and comprising, connected in series:
    means for dissipating electrical energy returned by the electromechanical machine to the input terminals of the inverter during a braking phase of the electromechanical machine;
    switching means for closing the electrical circuit during a braking phase of the electromechanical machine and for opening the electrical circuit in absence of a braking phase of the electromechanical machine;
    wherein the means for dissipating the electrical energy comprises an inductor wound around a magnetic circuit, energy recovered by the inductor during the braking phase being dissipated by loss of hysteresis and eddy currents in the magnetic circuit;
    a differential mode filter comprising a filtering inductor, wound around a magnetic circuit placed in series between the DC voltage source and the inverter; and
    a filtering capacitor placed between the input terminals of the inverter, the filtering inductor and the dissipation inductor have a shared magnetic circuit.

2. The electric brake system according to claim 1, wherein the filtering inductor and the dissipation inductor are not magnetically coupled to each other.

3. The electric brake system according to claim 2, wherein the magnetic circuit is an EI or EE circuit, the filtering inductor comprising two identical coils connected in series, each coil being wound on an outer leg of the E, the dissipation inductor being wound on a central leg of the E.

4. The electric brake system according to claim 2, wherein the magnetic circuit is an EI or EE circuit, the dissipation inductor comprising two identical coils connected in series, each coil being wound on an outer leg of the E, the filtering inductor being wound on a central leg of the E.

5. The electric brake system according to claim 1, wherein the filtering inductor and the dissipation inductor are coupled together.

6. The electric brake system according to claim 5, wherein the magnetic circuit is an O-shaped circuit including two opposite winding branches, the filtering inductor including two coils connected in series, each being wound around a branch, the dissipation inductor including two coils connected in series, each also being wound around a branch.

7. The electric brake system according to claim 6, wherein the O-shaped magnetic circuit includes two C-shaped portions fastened to each other via air gaps made from a non-magnetic material.

8. The electric brake system according to claim 1, wherein the magnetic circuit of the dissipation inductor includes thermal insulating means making it possible to control a level of thermal flow towards a wall of a case on which it is fastened.

* * * * *